Aug. 2, 1966  J. S. GOLIGHTLY  3,264,082

GLASS SHEET BENDING MOLD WITH HEAT ABSORBER

Filed April 22, 1965  3 Sheets-Sheet 1

INVENTOR.
JAMES S. GOLIGHTLY
BY
Oscar L. Spencer
ATTORNEY

INVENTOR.
JAMES S. GOLIGHTLY
BY
Oscar L. Spencer
ATTORNEY

INVENTOR
JAMES S. GOLIGHTLY
Oscar L. Spencer
ATTORNEY

United States Patent Office 3,264,082
Patented August 2, 1966

3,264,082
GLASS SHEET BENDING MOLD WITH
HEAT ABSORBER
James S. Golightly, Fox Chapel, Pa., assignor to Pittsburgh
Plate Glass Company, Pittsburgh, Pa., a corporation of
Pennsylvania
Filed Apr. 22, 1965, Ser. No. 451,691
The portion of the term of the patent subsequent to
Aug. 24, 1982, has been disclaimed
4 Claims. (Cl. 65—288)

This application is a continuation-in-part of application Serial No. 649,208, filed March 28, 1957, for Bending Glass Sheets now abandoned.

The present invention relates to bending glass sheets, and more specifically relates to apparatus for bending glass sheets into compound curves including a longitudinal bend having a relatively gently bent central portion merging into regions of severe bends to form opposed longitudinal extremities extending substantially parallel to each other and also including one longitudinally extending side portion bent transversely relative to the gently bent central portion.

Prior to the present invention, it had been considered necessary to complicate the structure of glass bending molds in order to produce compound curvatures from flat glass sheets, particularly the type of compound curvature that was introduced into the windshields of certain 1957 model automobiles. Certain automobile windshields require a local transverse bend in addition to the wrap-around bends of previous models wherein they extend in a continuous sweep from one side of the automobile completely across the front and around to the other side of the automobile. The transversely bent portion extends into the front of the automobile roof.

In the manufacture of such complexly curved windshields, it was previously considered necessary to utilize bending molds having many moving parts or provided with electrical heating elements or having both types of such structural elements easily damaged in use to fabricate the transverse bend. Simplifying the bending mold structure minimizes mold maintenance problems and facilitates the manufacture of compound bends. The present invention provides a simplified bending mold requiring minimum maintenance for producing such bends.

The present invention will be better understood after studying various illustrative embodiments which are described below. In the accompanying drawings, which form part of the description, like reference numerals refer to like structural elements. It is understood that this description is for purposes of illustration rather than limitation, reference to the latter being obtained from the appended claims.

In the drawings forming part of the present invention,

Figure 1:
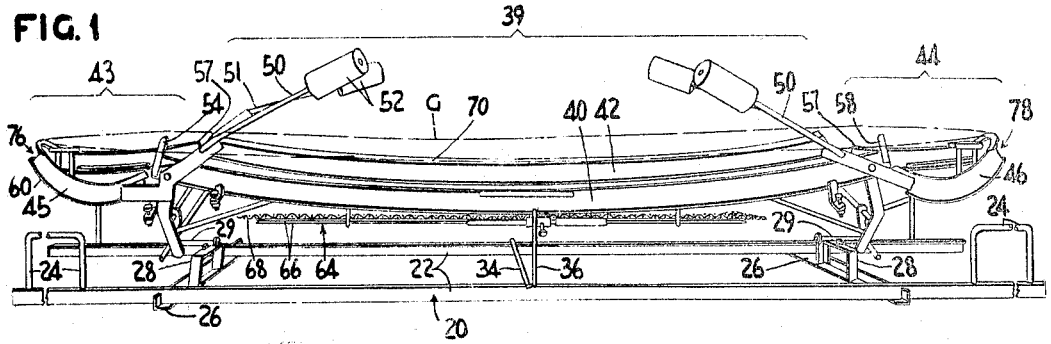
FIGURE 1 is an elevational view, partly in perspective, of one embodiment of a glass sheet bending mold exemplifying the present invention in the open position preparatory to receive a glass sheet.
Figure 2:
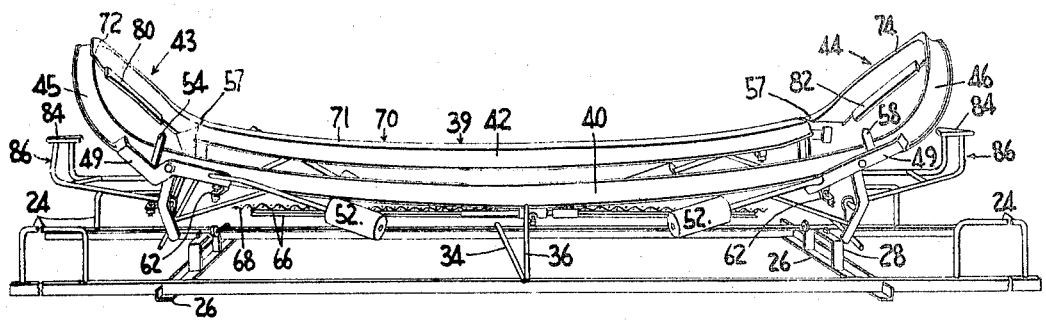
FIGURE 2 is a view similar to FIGURE 1 showing the mold in its closed position forming a continuous frame whose upper shaping surface conforms in outline and elevation to the contour desired for the margin of the bent glass sheet.
Figure 3:
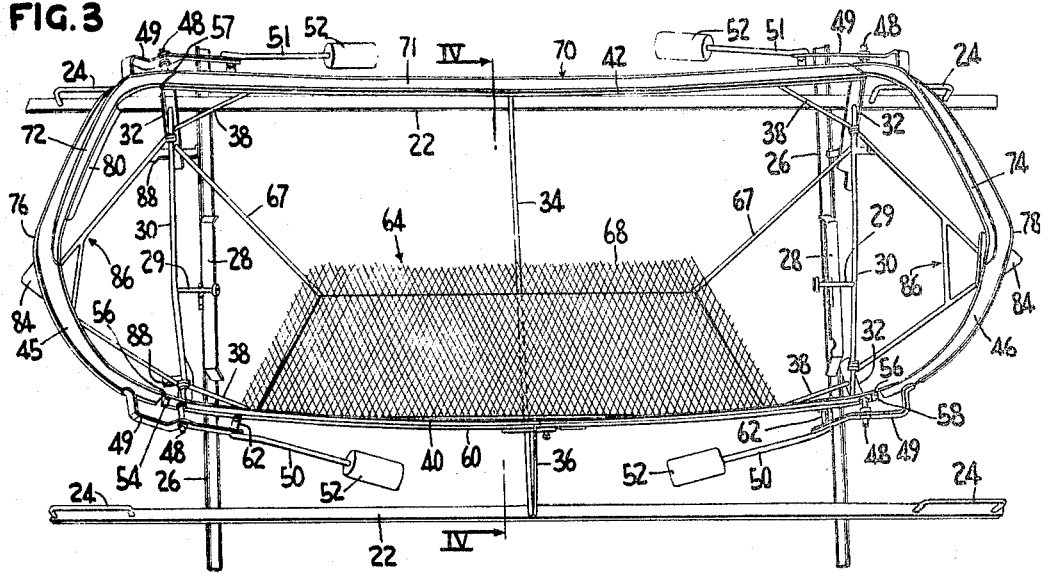
FIGURE 3 is a plan view partially in perspective of the mold as seen in FIGURE 2.

Referring specifically to FIGURES 1 through 4, reference number 20 shows a carriage frame which comprises a pair of spaced longitudinally extending angle irons 22 having handles 24 of inverted U-shape extending upwardly from the angle iron extremities. The longitudinal angle irons 22 are interconnected by transverse angle irons 26. A support bracket 28 is carried by each transverse angle iron for securing a stub rod 29 which is used to carry a support rod 30. The latter is connected at its extremities to angle braces 32 (FIGURE 3). A cross rod 34 interconnects the longitudinal angle irons 22 centrally thereof. A bracing rod 36 extends upwardly at an angle from angle iron 22. Additional bracing rods 38 extend angularly upwardly and inwardly from support rods 30.

Angle braces 32 and bracing rods 36 and 38 are all connected to the center mold section 39 of the bending mold carried by the carriage frame 20. The center mold section 39 comprises a pair of longitudinally extending spaced center rails 40 and 42 spaced from one another laterally of the mold a distance slightly less than the width of the bent glass sheet and end mold sections 43 and 44 comprise end section rails 45 and 46 pivoted relative to the central mold section 39 such as in present conventional sectionalized skeleton molds utilized to produce wrap-around bends.

In order to rotate the end sections 43 and 44 relative to the center section 39, stub hinges 48 are attached to the center section rails 40 and 42 adjacent their extremities and the end section rails 45 and 46 are extended inwardly to form metal straps 49 which terminate in lever arms 50 and 51. The straps 49 are journaled in the stub hinges 48 for rotation therewith. Counterweights 52 at the inboard extremities of the lever arms cause the lever arms and end mold sections to rotate from the open position depicted in FIGURE 1 to the closed position of FIGURE 2. This tendency for the end mold sections 43 and 44 to rotate into the closed mold position is inhibited by the mass of the flat glass sheet G resting on the open mold until the glass sheet is softened during the bending operation.

Fingers 54 and 58 are attached adjacent the longitudinal extremities 56 of rail 40 to abut the side edge of the glass sheet. These fingers guide the transverse alignment of the glass sheet on the mold during the bending operation. It is preferred to cover the fingers with a facing 59 (FIG. 4) of a material that does not harm the glass sheet edges at elevated temperatures. Asbestos, glass fiber cloth, etc., are preferred for such facing.

Each of the mold rails 40, 42, 44 and 46 are provided with a reinforcing flange 60 at its bottom extremity for reinforcement purposes. Such structure lessens the cross bracing needed to reinforce the mold.

Stops 62 are attached to the center mold section 39 to stop the rotation of the end mold sections 43 and 44 when the outline shaping surface attains the length and width dimensions desired for the bent glass sheet. The stops are located for contact by either the straps 49 or the arms 50 or 51 when the end mold sections have rotated sufficiently to attain the desired closed mold position.

A heat abstractor member 64 has a transverse dimension less than the width of the outline shaping surface (as measured transversely of the mold from the rail 40 to the rail 42). Member 64 is provided in the region underlying the portion of the glass sheet that is desired to be maintained relatively flat. Member 64 has a high heat capacity to absorb heat from the vicinity of the overlying portion of the glass sheet to prevent the latter from softening at times other glass sheet portions attain glass softening temperatures.

The heat abstractor or heat absorbing member 64 for the central mold section 39 comprises a plurality of layers of material including one or more metal plates 66 supported from the support rods 30 by means of additional support rods 67. A metal screen or an expanded metal plate 68 having an area greater than that of the underlying metal plate 66 is attached immediately above the latter so that its inboard marginal area immediately adjacent plate 66 is unsupported. The unsupported mesh screen portion forms the innermost boundary portion of the composite heat absorbing member 64 to provide a graduation in the pattern of the heat selectively abstracted from the overlying glass sheet, thus minimizing thermal shock between adjacent areas of the glass sheet subjected to selective heat abstraction and free from heat abstraction.

In other words, heat absorbing member 64 comprises a relatively massive portion of air impervious material coextensive in area with the solid metal plate 66 adjacent center section rail 40 and a relatively light portion of a perforated material coextensive in area with the peripheral portion defined by the marginal area of the metal screen or expanded metal plate 68 located beyond a portion of the periphery of the solid metal plate 66. The heat absorbing member is disposed in facing relation to a portion of a glass sheet mounted on the mold for bending to selectively abstract heat from the furnace atmosphere in the vicinity of the portion it faces. Thus, the relatively massive portion of the heat absorbing member abstracts a relatively large amount of heat from the vicinity of the glass sheet portion it faces and the relatively light peripheral portion of the heat absorbing member abstracts a lesser amount of heat per unit area of glass sheet portion that it faces. The glass sheet portion not facing the heat absorbing member has its heating rate substantially unaffected by the heat absorbing capacity of the heat absorbing member. Therefore, the relatively light peripheral portion of the heat absorbing member has a heat absorbing property that blends the heat absorbed in the vicinity of the glass between the portion of maximum heat absorption and that of essentially no heat absorption.

Spaced outboard of rail 42 which is designed to support the bent sheet adjacent its edge bordering the transversely curved portion is a continuous slide bar 70 having a highly polished upper glass supporting surface 71. Slide bars 72 and 74 are spaced outboard of the end section rails 45 and 46, respectively, to embrace portions of the latter. Each latter slide bar extends from an inboard extremity 57 of an end section rail 45 or 46 around a mold extremity 76 or 78 to terminate slightly inboard of the latter.

The slide bars 70, 72 and 74 extend obliquely upwardly and outwardly of the portion of the contour defined by the rail encompassed by the slide bar and are sufficiently thick to provide a rigid support for the portion of the periphery of the flat glass sheet that slides thereon. Each rail is shaped to conform longitudinally to a portion of the outline of the bent glass sheet and in transverse section to be tangent to the under surface of the bent glass sheet.

Figure 4:
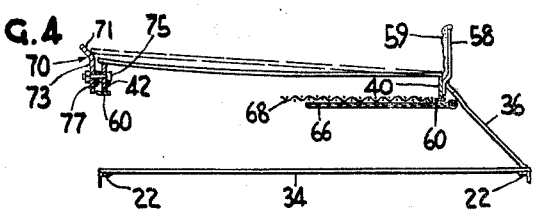
FIGURE 4 is a fragmentary view taken sectionally across the lines IV—IV of FIGURE 3 showing the curved glass sheet resting on the mold, with the relative position of the flat glass sheet shown in phantom.

The inboard extremities of each of the slide bars 70, 72 and 74 are spaced a slight distance from the frame defined by the upper shaping surfaces of mold rails 40, 42, 45 and 46 for reasons explained in copending application Serial No. 203,191 of James S. Golightly, filed June 18, 1962. A typical construction for attaching a slide bar in spaced relation to its adjacent mold rail is shown in FIGURE 4.

Slide bar 70 comprises an outwardly and obliquely extending portion whose upper surface 71 supports the bottom corner of the longitudinal side edge portion of the supported glass sheet in sliding relation, and a vertical slotted flange 73 bent from the slide portion. Rail 42 is apertured so that it can be secured to the slide bar by means of a nut and bolt 75 extending through the slotted flange and the mold rail aperture. A spacer sleeve 77 surrounds the bolt between the vertical slotted flange 73 and the mold rail 42.

The particular pattern to be fabricated by the mold depicted in FIGURES 1 through 3 requires each extremity to have an absolutely flat portion adjacent one lateral extremity. Therefore, in order to provide the necessary flat lateral extremities, abstractors 80 and 82 are attached to the inboard extremity laterally inboard of the end section rails 45 and 46 in addition to the usual heat abstractors 84 carried by A-frames 86 for decelerating the heat cycle for the tips of the glass sheet. Stop members 88 are attached to the support rods 30 to provide a stop supporting the A-frames when the additional abstractors 84 are in their proper position beneath the mold shaping surface.

When flat glass is prepared for bending, it is mounted to rest as a beam on the slide bars 72 and 74 at mold extremities 76 and 78, slide bar 70 and rail extremities 56 with one side edge resting against fingers 54 and 58. The locations of the latter are so chosen as to contact the glass at points of minimum vertical displacement for the glass sheet.

As the glass and the mold are passed through a bending lehr where they are subjected to elevated temperatures until the glass softening temperature is reached, the extremity portions of the softening glass sheet above the end mold sections 43 and 44 are folded upwardly by rotation of the latter and the tips of the glass slide upon the slide bars 72 and 74. The portion of the glass sheet immediately above the abstractor 64 is maintained relatively flat.

Figure 5:
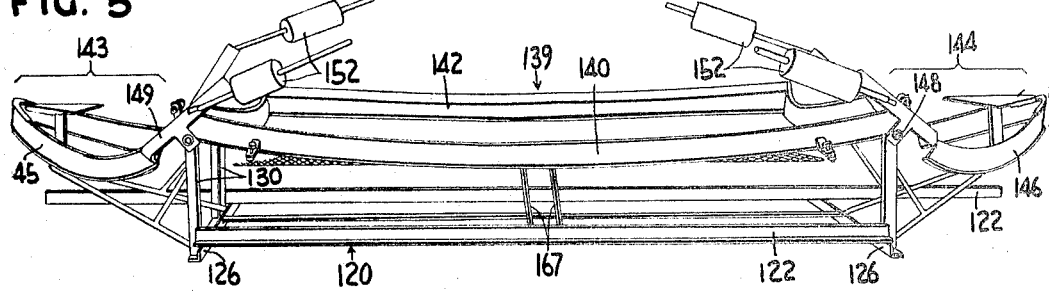
FIGURES 5, 6 and 7 are views similar to FIGURES 1, 2 and 3 of an alternate embodiment of the present invention.
Figure 6:
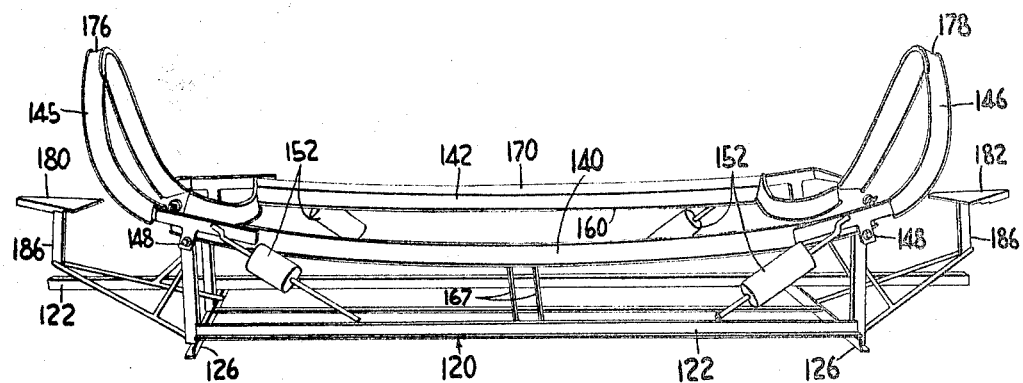
Figure 7:
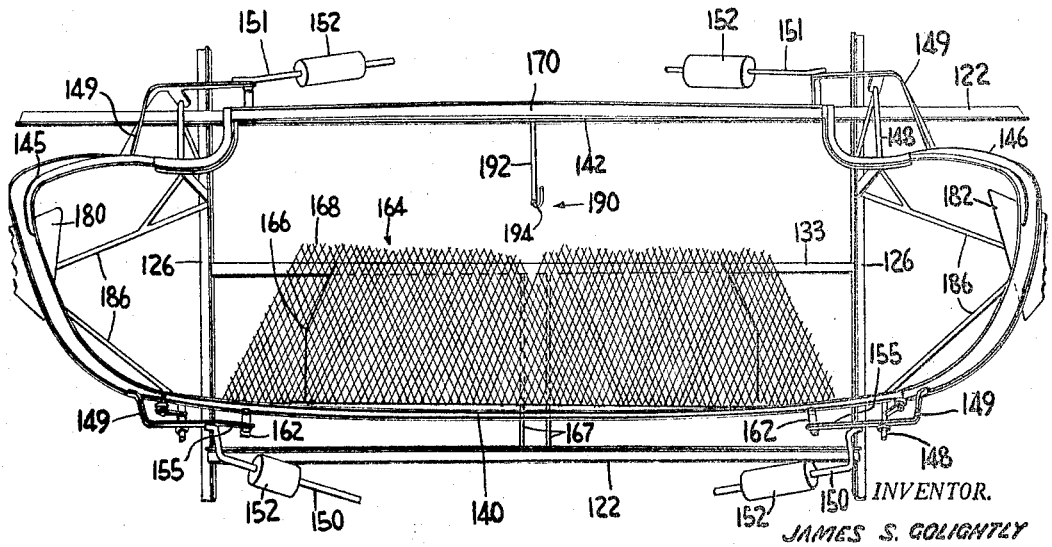

FIGURES 5, 6 and 7 show views similar to those of FIGURES 1, 2 and 3 for an alternate embodiment of the invention that has been found to be successful in commercial production. The bend required for this production pattern is slightly more complicated than the other because the windshield for this vehicle extends a considerable distance into the roof.

Figure 8:
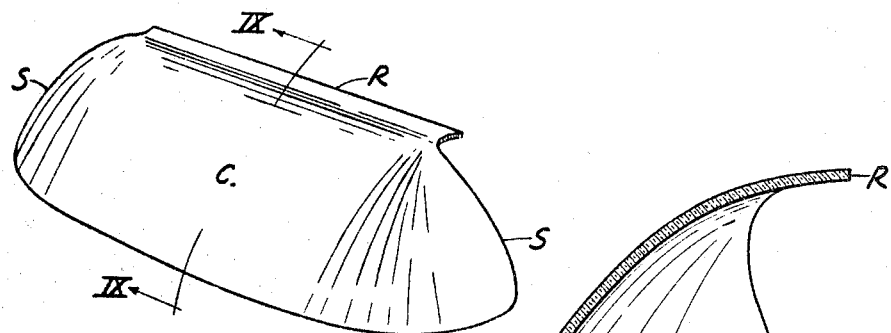
FIGURE 8 is a perspective view of a glass sheet bent on the structure shown in FIGURES 5, 6 and 7.
Figure 9:
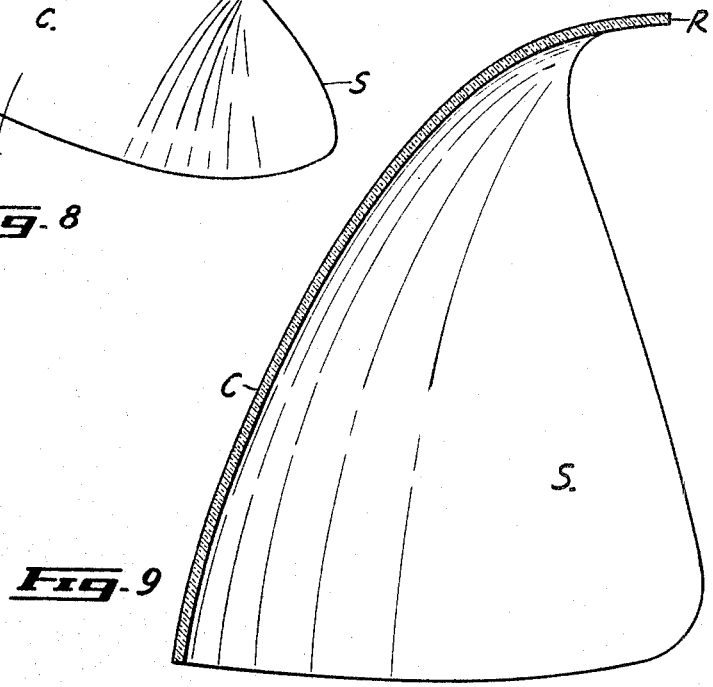
FIGURE 9 is a sectional view along the lines IX—IX of FIGURE 8.
Figure 10:
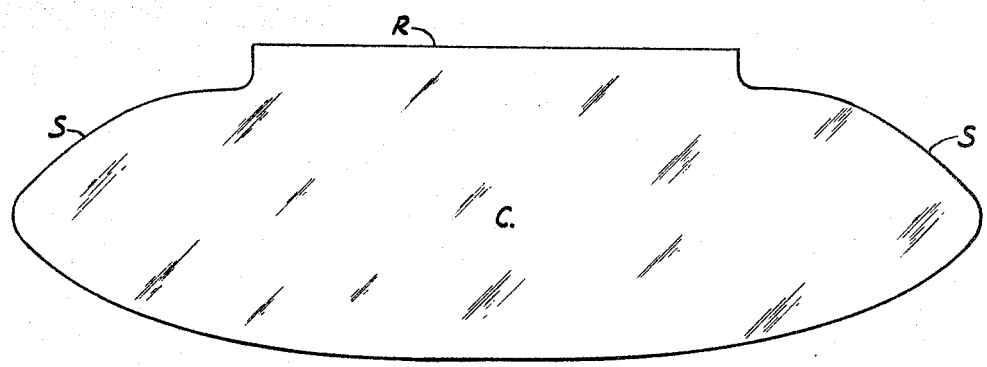
FIGURE 10 is a plan view of a flat glass sheet precut for bending on the mold of FIGURES 5, 6 and 7.

The structure of the glass sheet which forms part of the ultimate windshield is shown in FIGURES 8, 9 and 10. According to these drawings, the glass sheet comprises a center portion C terminating in tips S which are bent sharply relative to the central portion C to extend rearwardly at the sides of the automobile and a side extension R which is curved transversely to extend into the vehicle roof.

The mold of this embodiment comprises a carriage frame 120 which includes longitudinally extending angle irons 122 interconnected by transverse angle irons 126. Support rods 130 are provided to support the mold structure in spaced relation above its supporting carriage. An intermediate beam 133 interconnects the transverse angle irons 126.

The mold includes a center mold section 139 comprising a smoothly curved longitudinally extending center section rail 140 and a reversely curved longitudinally extending center section rail 142, and end mold sections 143 and 144 comprising end section rails 145 and 146 pivoted relative to the central mold section 139 such as in the first embodiment. The reversely curved portion of each end of reversely curved rail 142 includes a portion extending laterally inward from its longitudinally extending main portion and an extremity portion extending longitudinally outward from said laterally inward portion.

Stub hinges 148 are attached to the center section rails 140 and 142. Formed metal straps 149, which are pivoted about stub hinges 148, interconnect lever arms 150 and 151 to the opposite side extremities of the end mold sections 143 and 144. Each lever arm 150 and 151 is counterweighted at 152 to provide a bending moment tending to close the mold.

Each mold section is reinforced with a reinforcing flange 160 at its bottom extremity for purposes similar to that of the reinforcing flange 60 of the previous embodiment.

Each of the metal straps 149 for lever arms 150 is provided with an extension 155 which is designed to make contact with a stop member 162 similar to one of the stop members 62 of the previous embodiment.

The central mold section is provided with a heat abstractor 164 comprising one or more metal plates 166 attached by means of support rods 167 to a longitudinally extending angle iron 122 or the intermediate beam 133 and includes an upper screen 168 having a peripheral portion overlapping the periphery of the metal plates for purposes described above in connection with the first embodiment for element 68.

Heat absorbing members 64 and 164 comprise a solid plate 66 or 166 of relatively small area and an apertured member 68 of relatively large area. The solid plate is in face to face contact with the apertured member. The additional area of the apertured member extends beyond the laterally inner edge of the plate to form a relatively light portion at the innermost boundary of said heat absorbing member.

At the outboard extremities of the mold section, additional heat abstractor plates 180 and 182 are provided. These latter plates are supported from the transverse angle irons 126 by means of a supporting structure shown generally as 186 including braces and support rods.

This embodiment requires that the transverse bend be localized and spaced a considerable distance inboard of the reversely curved portion delinated by center mold section rail 142. Therefore, the rail 142 is provided with a slide bar 170 that is spaced therefrom and completely surrounds the laterally outer edge of the latter and extends obliquely upwardly outwardly of the portion of the outline defined by the rail. The end mold sections 145 and 146 are provided with slide bars 172 and 174, respectively, which are spaced therefrom to embrace the latter and extend slightly beyond the mold extremities 176 and 178 respectively.

A guide 190 which comprises a bent rod 192 attached at its fixed end to a longitudinally extending angle iron 122 and including a ceramic sleeve extending upwardly from the free upturned portion 194 of the rod terminates in the plane of ultimate curvature desired for the transverse sag in the region of maximum sag. Thus, operators attending a bending lehr are able to observe when the transverse bend has been completed and are thus able to adjust the controls in the lehr accordingly in order to insure optimum bends.

The form of the invention shown and described in this disclosure represents an illustrated preferred embodiment and a modification thereof. It is understood that various changes may be made without departing from the spirit of the invention as defined in the claimed subject matter that follows.

What is claimed is:

1. In a glass bending mold adapted to bend a glass sheet in a hot atmosphere to a complex shape including a transverse bend about an axis extending longitudinally of said sheet and comprising an outline shaping surface into conformity with which the glass sheet is to be bent, said shaping surface having a given length and width, a heat absorbing member having a dimension in a direction transverse of said outline less than the width of said outline shaping surface spaced from said shaping surface and positioned so as to face a surface of the glass sheet when supported on said shaping surface, said heat absorbing member comprising a relatively massive portion composed of air impervious material adjacent a portion of said outline shaping surface and a relatively light portion composed of a perforated material located beyond and immediately adjacent to a portion of the periphery of said relatively massive portion spaced from said portion of said outline shaping surface, said relatively light portion having a smaller effective surface area than that of a solid member of the same area and thickness by virtue of its open mesh configuration, said outlying shaping surface comprising a pair of elongated shaping side rails, and said heat absorbing mass being adjacent a side rail of the mold.

2. In apparatus as in claim 1, wherein the heat absorbing member is located below said shaping surface.

3. In apparatus as in claim 1, wherein said relatively light portion forms the laterally innermost boundary portion of said heat absorbing member to provide a graduation in the pattern of heat selectively abstracted from said supported glass sheet, thus minimizing thermal shock between adjacent areas of the glass sheet subjected to selective heat abstraction due to the heat absorbing property of said heat absorbing member and essentially free from said selective heat abstraction.

4. In apparatus as in claim 3, wherein said heat absorbing member comprises a solid plate of relatively small area and an apertured member of relatively large area in face to face contact with said solid plate, and extending transversely beyond the inner edge of said plate to form said relatively light portion of said heat absorbing member.

References Cited by the Examiner
UNITED STATES PATENTS 2,897,632  8/1959  Fowler et al. _____ 65—288 X
3,086,376  4/1963  Carson et al. _____ 65—288 X DONALL H. SYLVESTER, *Primary Examiner.*

S. LEON BASHORE, Jr., *Examiner.*

ARTHUR D. KELLOGG, *Assistant Examiner.*